United States Patent
Furomoto et al.

(10) Patent No.: US 6,955,314 B2
(45) Date of Patent: Oct. 18, 2005

(54) ROTOR FOR A SPINNING REEL

(75) Inventors: Yoshiyuki Furomoto, Kishiwada (JP); Tomohiro Nishikawa, Osaka (JP); Koji Ochiai, Sakai (JP); Tomokazu Kitazaki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/770,516

(22) Filed: Feb. 4, 2004

(65) Prior Publication Data

US 2004/0169100 A1 Sep. 2, 2004

(30) Foreign Application Priority Data

Feb. 5, 2003 (JP) .......................................... 2003-028465
Feb. 5, 2003 (JP) .......................................... 2003-028472

(51) Int. Cl.$^7$ .............................................. A01K 89/01
(52) U.S. Cl. .......................................................... 242/231
(58) Field of Search ................................ 242/231, 232, 242/230, 234

(56) References Cited

U.S. PATENT DOCUMENTS

| 4,196,869 | A |   | 4/1980  | Shepherd |          |
|-----------|---|---|---------|----------|----------|
| 4,509,705 | A |   | 4/1985  | Councilman et al. | |
| 5,379,957 | A | * | 1/1995  | Furomoto et al. | 242/230 |
| 5,673,868 | A | * | 10/1997 | Takeuchi | 242/231 |
| 5,743,478 | A | * | 4/1998  | Plestan | 242/231 |
| 5,765,781 | A | * | 6/1998  | Tsutsumi | 242/232 |
| 5,799,889 | A | * | 9/1998  | Plestan | 242/231 |
| 5,890,668 | A | * | 4/1999  | Hitomi | 242/241 |
| 5,947,397 | A | * | 9/1999  | Hitomi | 242/231 |
| 5,967,438 | A | * | 10/1999 | Furomoto et al. | 242/231 |
| 6,027,058 | A |   | 2/2000  | Furomoto et al. | |
| 6,336,604 | B1 | * | 1/2002  | Aratake et al. | 242/231 |
| 6,644,578 | B2 | * | 11/2003 | Hong | 242/231 |

FOREIGN PATENT DOCUMENTS

| EP | 369904 A  | 5/1990  |
| JP | 568528 S  | 1/1982  |
| JP | 10-276629 | 10/1998 |

OTHER PUBLICATIONS

Daiwa, Daiwa 1982 Catalog, catalog, 1982, p. 20, 21, and 100, Japan.

* cited by examiner

*Primary Examiner*—Emmanuel Marcelo
(74) *Attorney, Agent, or Firm*—Shinjyu Global IP Counselors, LLP (57) ABSTRACT

A rotor of a spinning reel includes a rotor unit, and a fishing line guide portion. The rotor unit has a body portion that is rotatably mounted on the reel unit, and first and second rotor arms that each extend forward from opposing positions on the outer peripheral surface of the body portion. The fishing line guide portion is mounted only on the first rotor arm. The first and second rotor arms are formed such that a line L1 drawn along the pivot center axis of the fishing line guide portion of and a line L2 drawn through the width-wise center of the second rotor arm and substantially parallel to the first line L1 are on opposite sides of the rotational axis X of the body portion. A spinning reel rotor having a fishing line guide portion arranged on only one rotor arm can maintain rotational balance.

22 Claims, 10 Drawing Sheets

ROTOR FOR A SPINNING REEL

BACKGROUND OF THE INVENTION

1. Field of the Invention

The present invention relates to a rotor. More particularly, the present invention relates to a rotor for a spinning reel which is rotatably mounted to a reel unit of a spinning reel and which winds fishing line around a spool that can move back and forth.

2. Background Information

A rotor for a spinning reel having a fishing line guide portion on only one rotor arm thereof (hereinafter referred to as a "bail-less type rotor") has been known in, as seen in for example Japanese Design Registration No. 568528 (hereinafter referred to as "'528 Design") and 1982 Daiwa General Catalog, pp. 20–21, published by Daiwa Seiko Inc. (hereinafter referred to as "Daiwa Catalog"). A conventional bail-less type rotor for a spinning reel includes a rotor unit that is rotatably mounted on a reel unit, and a fishing line guide portion that is mounted on the rotor unit so that it can pivot between a line-releasing posture and a line-winding posture.

The rotor unit has a body portion that is rotatably mounted on the reel unit, and first and second arms that extend forward from the rear end portions of the outer periphery of the body portion. As is clear from the figure on the left side view in the '528 Design, both rotor arms are positioned at substantially symmetrical positions relative to the rotational axis of the rotor.

The fishing line guide portion includes a support member that is mounted so as to be pivotable between a first rotor arm line-releasing posture (shown in the '528 Design) and a first rotor arm line-winding posture (shown in the Daiwa Catalog), a stationary shaft, a line roller, and a stationary shaft cover. As is clear from the figure on the left side view in the '528 Design, the support member is configured such that the pivot axis thereof crosses with the rotational axis of the rotor. The tip of the support member is disposed further outward than the pivot axis. Thus, the fishing line guide portion that includes the support part that is disposed such that it has a significant tilt with respect to the first rotor arm. The base end of the stationary shaft is mounted to the tip of the support member. The line roller is rotatably mounted on the stationary shaft, and can guide the fishing line. The stationary shaft cover is formed such that it is tapered toward the tip thereof, and extends in the same direction as the axis of the stationary shaft.

With a spinning reel having a bail-less type rotor configured in this manner, the fishing line guide portion is pivoted to the line-releasing posture when casting, and as the fishing line guide portion is grasped with the fingers of the hand not holding the fishing rod and returned to the line-winding posture after casting, the fishing line will be grasped and hooked onto the line roller. This allows the fishing line to be wound onto the spool when the rotor is rotated in the line winding direction.

With the aforementioned conventional configuration, because the first and second rotor arms are disposed in substantially symmetrical positions relative to the rotational axis of the rotor, the rotational balance of the rotor would be maintained if this was the entire configuration. However, because the fishing line guide portion is tilted severely outward from the tip of the first rotor arm, when the rotor is rotated in the line winding direction, the rotational balance of the rotor will worsen, and it will be difficult to rotate the rotor smoothly.

In view of the above, it will be apparent to those skilled in the art from this disclosure that there exists a need for an improved rotor of a spinning reel that overcomes the problems discussed above. This invention addresses this need in the art as well as other needs, which will become apparent to those skilled in the art from this disclosure.

SUMMARY OF THE INVENTION

An object of the present invention is to provide a spinning reel rotor which has a fishing line guide portion arranged on only one rotor arm thereof and which can maintain rotational balance.

A spinning reel rotor according to the first aspect of the present invention is rotatably mounted to a reel unit of a spinning reel and winds fishing line around a spool that can shift back and forth, and includes a rotor unit and a fishing line guide portion. The rotor unit has a body portion that is rotatably mounted to the reel unit, and first and second rotor arms that each extend forward from opposing positions on an outer peripheral surface of a rear end portion of the body portion. The fishing line guide portion is mounted only on the first rotor arm such that the fishing line guide portion can pivot between a line-winding posture and a line-releasing posture. The first and second rotor arms are formed such that a first line that is drawn along the pivot center axis of the fishing line guide portion of the first rotor arm and a second line drawn through the width-wise center of the second rotor arm and substantially parallel to the first line have the rotational axis of the body portion interposed therebetween and are disposed on opposite sides of the rotational axis.

In this rotor for a spinning reel, the first line drawn along the pivot center axis of the fishing line guide portion of the first rotor arm and the second line drawn through the width-wise center of the second rotor arm and substantially parallel to the first line have the rotational axis interposed therebetween and are disposed on opposite sides of the rotational axis. Here, because the pivot center axis of the fishing line guide portion mounted on the first rotor arm is tilted with respect to the rotational axis of the body portion, the fishing line guide portion can be tilted with respect to the rotational axis, and the fishing line guide portion can be disposed in a position which will easily guide fishing line to the line winding portion of the spool that is disposed concentric with the rotational axis. In addition, because the center of gravity of the second rotor arm is shifted away from the rotational axis on a side opposite from the first rotor arm, the rotational balance can be easily obtained even if the centers of gravity of fishing line guide portion and the first rotor arm are shifted from the rotational axis.

In the rotor for a spinning reel according to the second aspect of the present invention is the rotor as set forth in the first aspect, where the first and second lines are disposed at a substantially equal distance from the rotational axis. Here, rotational imbalance caused by shifting the center of gravity of the fishing line guide portion can be corrected with better accuracy, and the exterior appearance of the rotor will be improved.

The rotor for a spinning reel according to the third aspect of the present invention is the rotor as set forth in the first or second aspect, in which the second rotor arm extends forward further than the first rotor arm. A distance (R1) in an axial direction of the spool between a rear surface of a rear end of the body portion and a front end of the first rotor arm is shorter than a distance (R2) in the axial direction of the spool between the rear surface of the rear end of the tubular portion and a front end of the second rotor arm. Here, the center of gravity of the second rotor arm can be brought closer to the center of gravity of the first rotor arm, which includes the fishing line guide portion. Thus, the rotational balance can be further corrected.

The rotor for a spinning reel according to the fourth aspect of the invention is the rotor as set forth in one of the first through third aspects, and further includes a first weight member that is accommodated within the second rotor arm. Here, the rotational balance can be further corrected because the first weight member is provided in the second rotor arm, which is lighter than the weight of the first rotor arm side that includes the fishing line guide portion.

The rotor for a spinning reel according to the fifth aspect of the present invention is the rotor disclosed in the fourth aspect, in which the first weight member is accommodated in the tip of the second rotor arm. Here, because the first weight member is disposed on the front portion of the second rotor arm, the center of gravity of the second rotor arm can be brought closer to the center of gravity of the first rotor arm, whose center of gravity is toward its tip portion. Accordingly, the fishing line guide portion can be mounted on the tip of the first rotor arm, and the rotational balance of the rotor can be further corrected.

The rotor for a spinning reel according to the sixth aspect of the invention is the rotor as set forth in one of the first through fifth aspects, further including a tubular-shaped line-entanglement prevention member that is mounted to the body portion, and a second weight member that is disposed on the inner peripheral surface of the line-entanglement prevention member such that the rotational axis of the line-entanglement prevention member such that the rotational axis of the body portion is interposed between the second weight member and the fishing line guide portion. Here, the fishing line can be prevented from wrapping around the spool shaft by the line-entanglement prevention member, and the rotational balance of the rotor, which is easily disturbed by mounting the fishing line guide portion thereon, can be further corrected by use of the second weight member mounted on the inner peripheral surface of the line-entanglement prevention member.

The rotor for a spinning reel according to the seventh aspect of the present invention is the rotor as set forth in one of the first through sixth aspects, in which the fishing line guide portion includes a support member that is pivotably mounted on the tip of the first rotor arm, a stationary shaft whose base end is mounted to the tip of the support member, a line roller that is rotatably mounted to the stationary shaft and capable of guiding the fishing line, a stationary shaft cover that is provided on the tip of the stationary shaft and includes a fishing line guide surface that guides the fishing line to the line roller, and a fishing line-catching portion that is provided on the tip of the stationary shaft cover. Here, the fishing line can be guided to the spool by the line roller provided on the fishing line guide portion.

The rotor for a spinning reel according to the eighth aspect of the present invention is the rotor as set forth in the seventh aspect, in which the stationary shaft cover is an approximately cone shaped member whose vertex tilts rearward further from the tip of the stationary shaft. Here, because the stationary shaft cover is cone shaped and the vertex thereof tilts rearward, the fishing line guided by the stationary shaft cover can be smoothly moved to the line roller.

The rotor according to the ninth aspect of the present invention is the rotor as set forth in one of the first through eighth aspects, in which a thickness (D1) in the radial direction of a front end side of the second rotor arm is thicker than a thickness (D2) in the radial direction of a rear end side of the second rotor arm. Here, the center of gravity of the second rotor arm can be easily disposed forward of the center of gravity of the first rotor arm by forming the front end side of the second rotor arm to be thicker than the rear end side thereof.

The rotor according to the tenth aspect of the present invention is the rotor as set forth in one of the first through ninth aspects, in which the second rotor arm includes a cut-out portion formed on its rear end side. Here, by reducing the weight of the rear end portion of the second rotor arm, the center of gravity of the second rotor arm can be reliably disposed forward of the center of gravity of the first rotor arm.

The rotor according to the eleventh aspect of the present invention is the rotor as set forth in one of the first through tenth aspects, in which a tip portion of the second rotor arm is formed into a shape that projects forward. Here, the design of the second rotor arm can be improved, and the fishing line can be prevented from becoming entangled on the tip portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
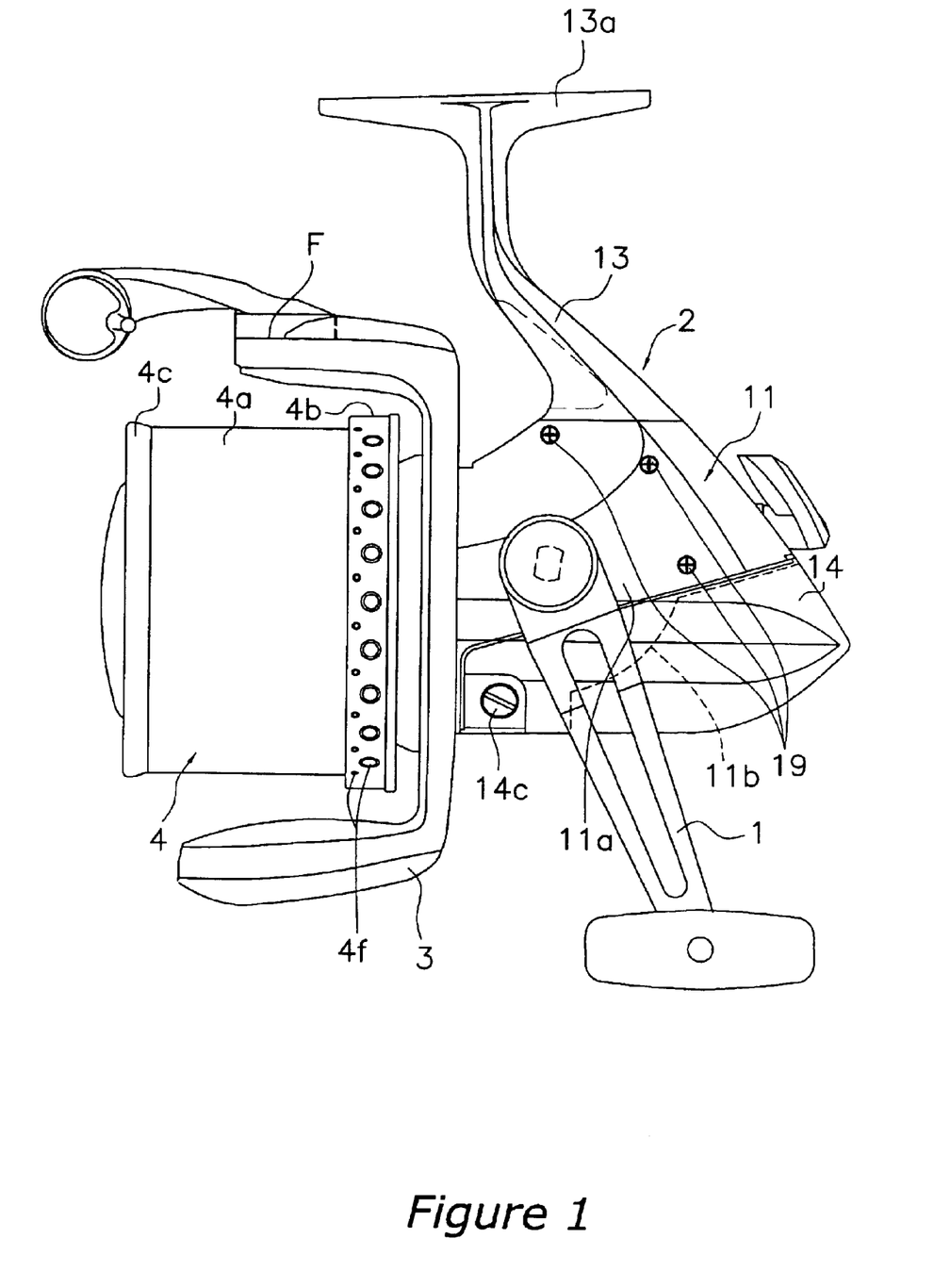
FIG. 1 is a side view of a spinning reel in accordance with one embodiment of the present invention.
Figure 2:
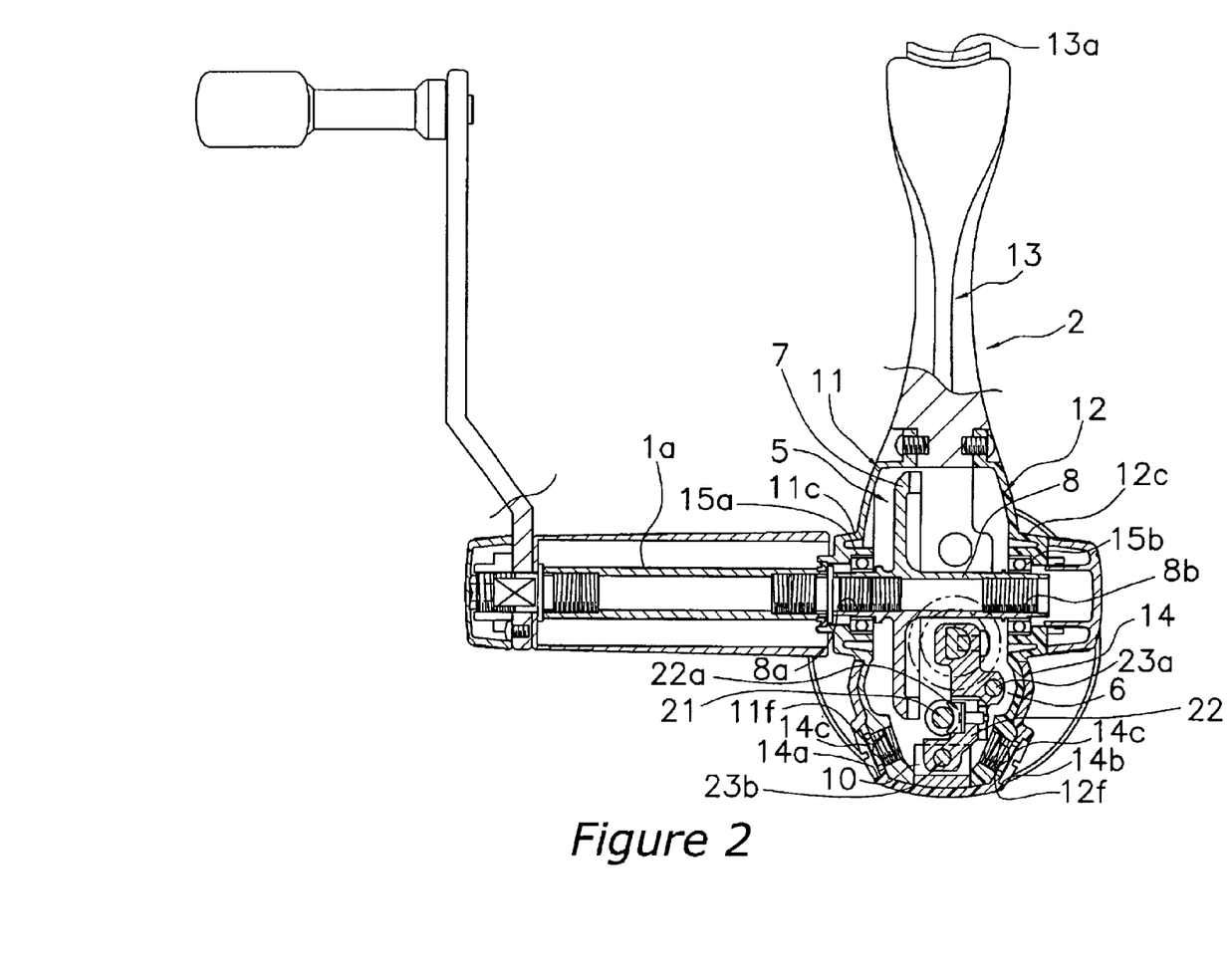
FIG. 2 is a cross-sectional rear view of the spinning reel in accordance with the embodiment of the present invention.
Figure 3:
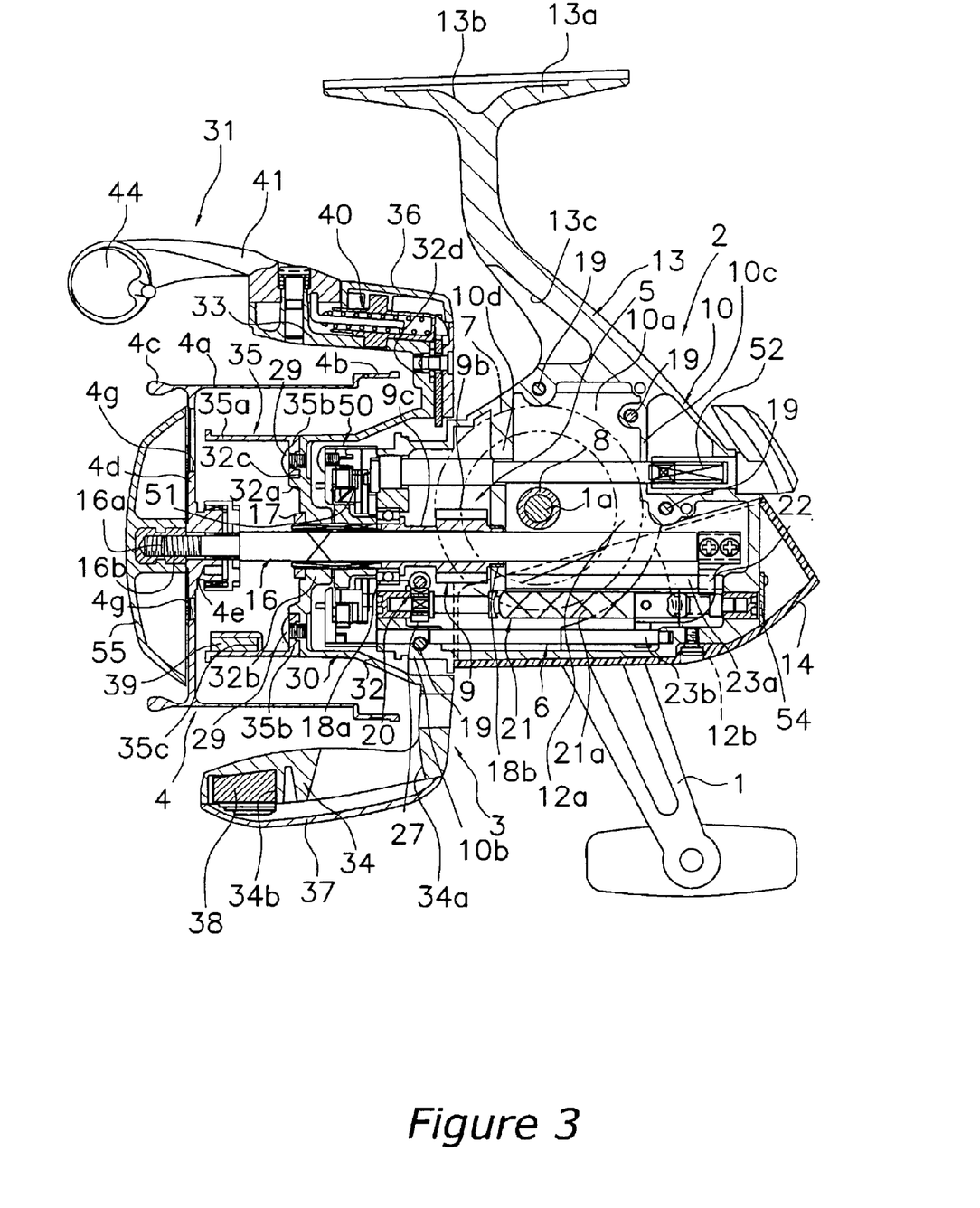
FIG. 3 is a side cross-sectional view of the spinning reel in accordance with the embodiment of the present invention.

Referring to FIGS. 1 to 3, a spinning reel according to one embodiment of the present invention primarily includes a handle assembly 1, a reel unit 2 adapted to be mounted to a fishing rod and rotatably supporting the handle assembly 1, a rotor 3 rotatably mounted on the front portion of the reel unit 2, and a spool 4 that is disposed on the front portion of the rotor 3 and which moves back and forth. The spinning reel additionally includes a rotor drive mechanism 5 for driving the rotor 3 to rotate in cooperation with rotation of the handle assembly 1, and an oscillating mechanism 6 for moving the spool 4 back and forth in cooperation with rotation of the rotor 3.

Reel Unit 2

The reel unit 2 accommodates the rotor drive mechanism 5 and the oscillating mechanism 6 in the interior thereof. The reel unit 2 includes, as shown in FIGS. 1 to 4, a housing unit 10 having an opening on both sides thereof, first and second lids 11 and 12 for closing both sides of the housing unit 10, a rod-attachment portion 13 formed integrally with the housing unit 10, and a cover member 14 for covering the housing unit 10, the first lid 11 and the second lid 12 from the rear ends thereof.

The housing unit 10 has an anodic oxide film formed on the surface thereof, and is made of, for example, a magnesium alloy which is lightweight and capable of maintaining specific strength. The housing unit 10 is a frame-shaped member in which both sides are opened to form an accommodation space 10a that serves to accommodate and support the rotor drive mechanism 5 and the oscillating mechanism 6. The housing unit 10 has a substantially uniform depth dimension (the dimension along the orthogonal direction to the plane of FIG. 3). A disk-shaped mechanism support portion 10b is formed in the front surface of the housing unit 10, and has mounted thereto a pinion gear 9, a one-way clutch 51 for an anti-reverse mechanism 50. An operation support portion 10c for supporting a switching operation unit 52 of the anti-reverse mechanism 50 is formed in the rear portion. An intermediate support portion 10d for supporting the pinion gear 9 and the switching operation unit 52 extends downward from the upper portion at the rear of the mechanism support portion 10b.

A first lid 11 is a member made of an aluminum alloy that can maintain high specific strength and corrosion resistance, and is formed so as to cover one side of the housing unit 10. The first lid 11 is, as shown in FIG. 2, arranged adjacent to a master gear 7. As is clear from FIGS. 1 and 4, the first lid 11 includes a first cover portion 11a for covering the master gear 7 that rotates according to rotation of the handle assembly 1 in the opening of one side of the housing unit 10, and a first cut-out 11b that exposes an opening rearward from the first cover portion 11a (further rearward than the portion indicated by the dashed line in FIG. 1). This type of first cut-out 11b is formed to minimize the overlapping portion between the first lid 11 and the cover member 14 to achieve weight reduction.

Figure 4:
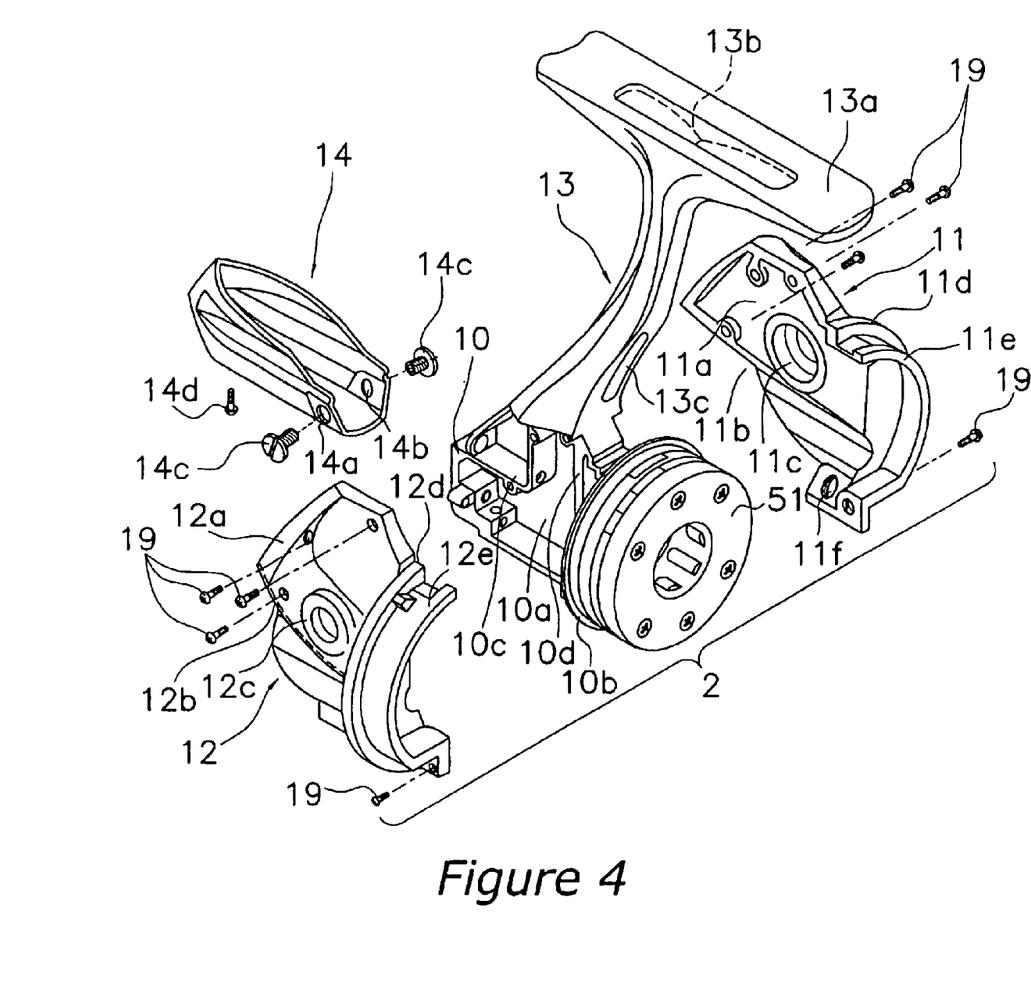
FIG. 4 is an exploded oblique view of a reel unit in accordance with the embodiment of the present invention.

As shown in FIGS. 2 and 4, a first boss portion 11c that supports one end of a master gear shaft 8 on which the master gear 7 is arranged is formed on the first lid 11, and protrudes outward on the approximate central portion of the wall surface. An approximately semi-circular first flange portion 11d that constitutes a disk-shaped portion that enters inside the rotor 3 is formed on the front portion of the first lid 11. An approximately semi-circular arc-shaped first mechanism accommodating cover 11e that is disposed on the rear surface of the mechanism support portion 10b and approximately flush with the outer peripheral surface of the mechanism support portion 10b is formed on the front portion of the first flange portion 11d. Since the master gear 7 is adjacently arranged to the first lid 11, a large force tends to act on the first boss portion 11c when the master gear shaft 8 receives a large load. In view of this, the first lid 11 is made of metal in order to keep the specific strength high. In a lower front portion of the first lid 11, a first screw hole 11f is formed for fitting the cover member 14 and for performing maintenance such as draining water after washing or filling with grease.

The second lid 12 has a shape that is substantially symmetrical and has a mirror image relationship with the first lid 11. Provided therewith are a second cover portion 12a, a second cut-out 12b, a second boss portion 12c, a second flange portion 12d having substantially a mirror image relationship with the first flange portion 11d, and a mechanism accommodating cover 12e. A second screw hole 12f (see FIG. 2) is also formed at a location opposing the first screw hole 11f. The first and second flange portions 11d and 12d are formed so as to constitute a circular shape together with the outer peripheral surface of the rear of the mechanism support portion 10b of the housing unit 10. This circular portion is configured so as to be inserted in the rear of the rotor 3 at a slight gap. The second lid 12 is arranged relatively far from the master gear 7, so a large force is not likely to act on the second boss portion 12c. Accordingly, in order to achieve weight reduction, it is made of a synthetic resin such as nylon 66. The second boss portion 12c is formed to protrude outward on the approximate central portion of the wall surface of the second lid 12 and opposing the first boss portion 11c, and serves to support the other end of the master gear shaft 8.

It should be noted that both the lid portions 11 and 12 are fastened by fastening screws 19 such as round-head screws to the housing unit 10. Various modifications are conceivable for the method of fastening the lids 11 and 12. For example, the lids 11 and 12 may be fastened by screws passing from one of the lids to the other lid through the housing unit 10.

The rod-attachment portion 13 is a T-shaped member extending upward from the housing unit 10, and a reel foot 13a formed on the tip thereof and extending longitudinally is adapted to be mounted onto a reel seat (not shown) of a fishing rod. The rod-attachment portion 13 is formed so that thickness-reducing portions 13b and 13c are formed in its upper face and front face to attain weight reduction and uniform wall thickness.

The cover member 14 is curved so as to cover the sides and the bottom of the housing unit 10 onto which the first and second lids 11 and 12 are mounted from the rear. The cover member 14 is provided in order to close the first and second cut-outs 11b and 12b formed at the rear of the first and second lids 11 and 12, and to prevent from being scratched the side and the rear faces of the housing unit 10 and lids 11 and 12, including their rear end corners. The cover member 14 is made of a relatively hard synthetic resin such as ABS resin, and its surface is subjected to metal plating. In the cover member 14, stepped screw-fitting holes 14a and 14b are formed at the locations corresponding to the first and second screw holes 11f and 12f. Screw members 14c screwed through the first and second screw holes 11f and 12f are screwed through these screw-fitting holes 14a and 14b respectively so that the cover member 14 is fastened to both of the lids 11 and 12, and also that the cover member 14 can be opened for maintenance. The cover member 14 is screwed onto the lower surface of the housing unit 10 at the rear end of the lower surface of the cover member 14. It is also retained by means of a screw member 14d.

With a reel unit 2 thus configured, the first lid 11, which is arranged adjacent to the master gear 7 and is thus likely to be acted on by a relatively large force, can be made to have a high specific strength. In the mean time, weight reduction is possible because the first lid 11 is made of an aluminum alloy, which is lightweight and has a high specific strength. Moreover, because the second lid 12, which is far from the master gear 7 and is thus unlikely to be acted on by such a large force, is made from a synthetic resin, weight reduction is achieved. Furthermore, since the housing unit 10 is made of a magnesium alloy, the specific strength of the reel unit 2 as a whole is kept high and weight reduction is achieved.

Rotor Drive Mechanism 5

The rotor drive mechanism 5 includes the master gear shaft 8 into which a handle assembly shaft 1a of the handle assembly 1 is screwed. The master gear 7 is formed integrally with the master gear shaft 8 and a pinion gear 9 that meshes with the master gear 7.

The master gear shaft 8 is rotatably mounted to the reel unit 2 via bearings 15a and 15b fitted onto the first and second boss portions 11c and 12c. The boss portions 11c and 12c are formed in the respective lids 11 and 12 of the reel unit 2. Threaded portions 8a and 8b are respectively formed on the inner circumferential surfaces of both ends of the master gear shaft 8. The threaded portions 8a and 8b are screws that are tightened when the handle assembly 1 is rotated in a line reel-in direction. Therefore, the threaded portion 8a on the left of FIG. 2 is a left-hand screw, whereas the threaded portion 8b on the right of FIG. 2 is a right-hand screw. It should be noted that the handle assembly 1 can be attached to either end of the master gear shaft 8, either to the left side as shown in FIGS. 1 and 2 or the right side as shown in FIG. 3. Nevertheless, because the threaded portions 8a and 8b have different tightening directions, respective handle shafts 1a are made available for specific use in attaching the handle shaft 1a on respective sides. FIG. 2 shows the handle shaft 1a for the left handle assembly 1.

The pinion gear 9 is a hollow tubular member, and its front portion passes through the rotor 3 and is mounted non-rotatably to the rotor 3. A spool shaft 16 is disposed so as to pass through the inner circumference of the pinion gear 9. A nut 17 is fitted to the front of the pinion gear 9, and the rotor 3 is fixedly coupled to the pinion gear 9 by means of the nut 17. The pinion gear 9 is supported rotatably by the respective bearings 18a and 18b at its mid-portion and rear end portion with respect to the shaft axis in the housing unit 10 of the reel unit 2. The bearing 18a is fitted to the mechanism support portion 10b, and the bearing 18b is fitted to the intermediate support portion 10d. A ring-shaped cut-out 9c is formed in a gear portion 9b formed on the rear end side of the pinion gear 9. The ring-shaped cut-out 9c is provided in order to compactly house a later-described gear-down train 20.

Rotor drive mechanisms are well-known components in the art. Thus, its structure and functions will not be described in further details herein.

Oscillating Mechanism 6

The oscillating mechanism 6 includes, as shown in FIGS. 2 and 3, a gear-down train 20 that meshes with the pinion gear 9, a worm shaft 21 that rotates in cooperation with the gear-down train 20, a slider 22 that engages with the worm shaft 21 and moves back and forth, and two guide shafts 23a and 23b for guiding the slider 22 in the spool shaft 16 direction.

Figure 5:
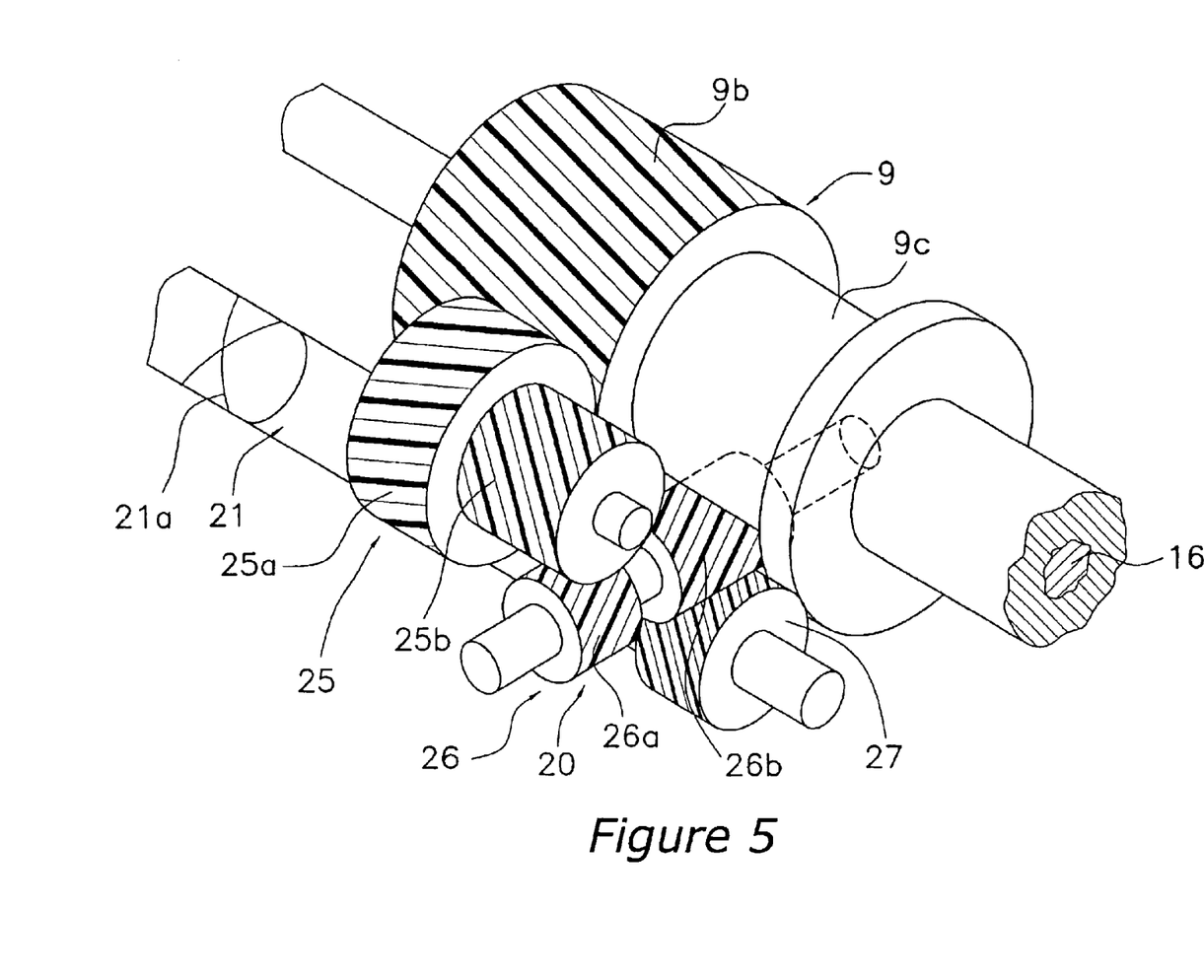
FIG. 5 is an oblique view of a gear-down train of the spinning reel in accordance with the embodiment of the present invention.

As shown in FIG. 5, the gear-down train 20 includes a stepped gear unit 25, a first intermediate gear shaft 26, and a driven gear 27. The stepped gear unit 25 has a large diameter gear 25a and a small diameter gear 25b, the large diameter gear 25a meshing with the pinion gear 9. The first intermediate gear shaft 26 includes a first intermediate gear 26a that meshes with the small diameter gear 25b and a second intermediate gear 26b spaced apart from the first intermediate gear 26a. The driven gear 27 is fitted non-rotatably to the worm shaft 21 and meshes with the second intermediate gear 26b.

The stepped gear unit 25 rotates around an axis parallel to the pinion gear 9. The large diameter gear 25a is a screw gear that meshes with the pinion gear 9. The small diameter gear 25b, the first intermediate gear 26a, the second intermediate gear 26b, and the driven gear 27 are also screw gears. The intermediate shaft 26 rotates around an axis different from that of the stepped gear unit 25, and the worm shaft 21, to which the driven gear 27 is fitted, rotates around an axis that is different from that of the intermediate shaft 26 and is parallel to the pinion gear 9. The second intermediate gear 26b of the intermediate shaft 26 is disposed below the cut-out 9c of the pinion gear 9. As a consequence, the worm shaft 21 can be arranged closer to the pinion gear 9 than when the cut-out is not formed, and thus the reel as a whole can be made compact. With the gear-down train 20 thus configured, the rotational speed of the pinion gear 9 is greatly reduced when transmitted to the worm shaft 21.

The worm shaft 21 is a member that has intersecting helical grooves 21a formed thereon, and is disposed parallel to the spool shaft 16. The worm shaft 21 is rotatably mounted on the front and rear ends of the housing unit 10 via bearings made of, for example, a synthetic resin. The worm shaft 21 is inserted from the rear of the housing unit 10, and is retained by a fixing plate 54 screwed to the rear surface of the housing unit 10.

The slider 22 has an engaging member 22a that engages with the grooves 21a of the worm shaft 21. The slider 22 is coupled to the rear end of the spool shaft 16 non-rotatably and axially immovably. With the tip of the engaging member 22a engaging with the grooves 21a, the slider 22 moves back and forth in the spool shaft direction in accordance with rotation of the worm shaft 21, and moves the spool shaft 16 back and forth in cooperation with rotation of the handle assembly 1.

The guide shafts 23a and 23b pass through the slider 22, and guide the slider 22 along the spool shaft 16. The guide shaft 23a is fixedly supported at both ends thereof by the rear end and the intermediate support portion 10d of the housing unit 10. The guide shaft 23a is mounted from the rear of the housing unit 10, and its rear end is retained by the fixing plate 54 that retains the worm shaft 21. The guide shaft 23b is also fixedly supported at both ends thereof by the front and rear ends of the housing unit 10. The guide shaft 23b is inserted from the front of the housing unit 10. The front portion of the guide shaft 23b can come into contact with the fastening screw 19 that fastens the front portion of the first lid 11, such that the guide shaft 23b is retained by the fastening screw 19.

Oscillating mechanisms are well-known components in the art. Thus, its structure and functions will not be described in further details herein.

Rotor 3

The rotor 3 is a so-called bail-less type rotor in which a fishing line guide portion is provided on only one of the rotor arms.

The rotor 3 includes, as shown in FIGS. 3, 6 to 8, and 10, a rotor unit 30 rotatably mounted to the reel unit 2 via the pinion gear 9, and a fishing line guide portion 31 fitted pivotably onto the rotor unit 30.

Figure 6:
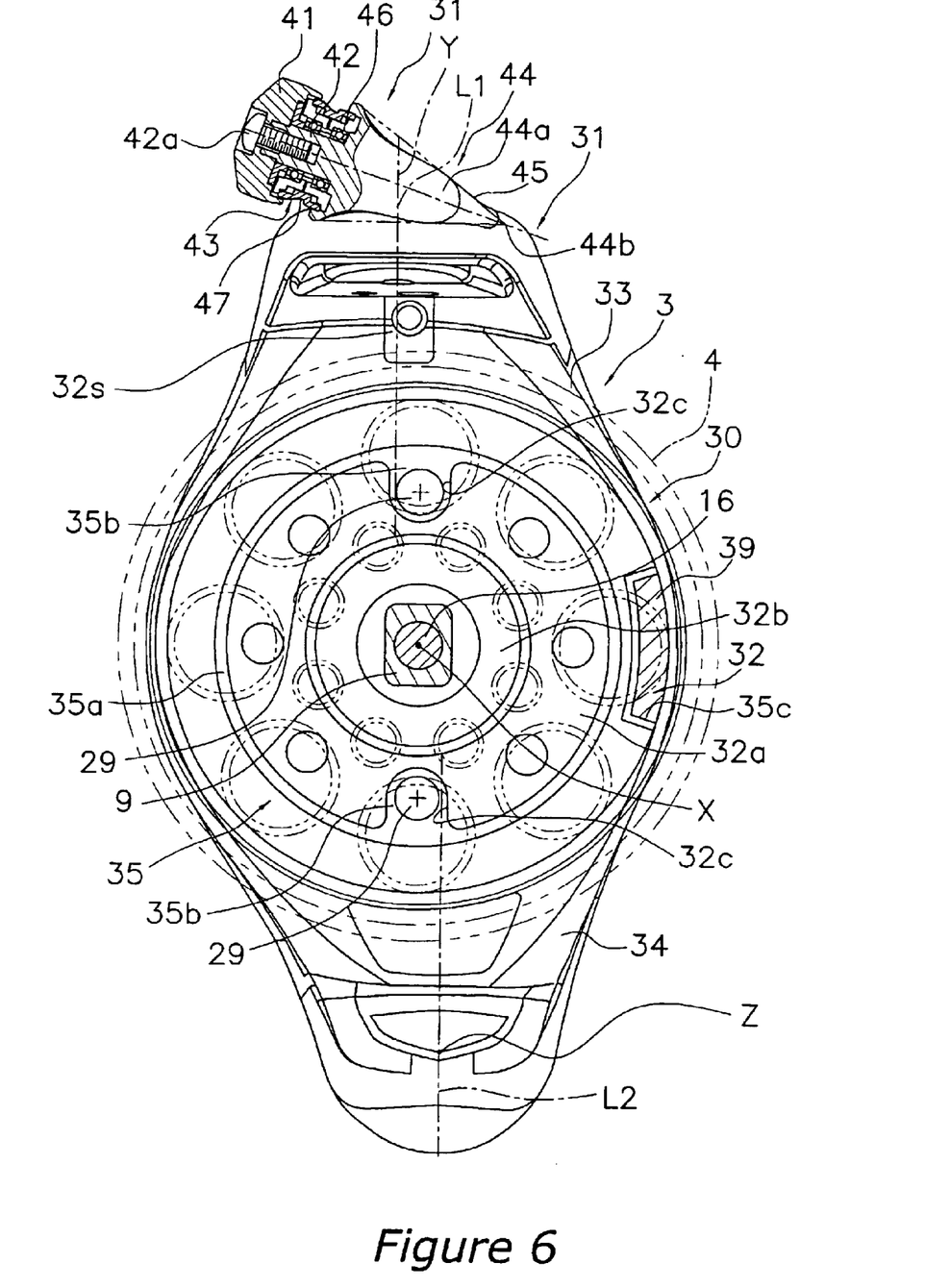
FIG. 6 is a front view of a rotor in accordance with the embodiment of the present invention.

The rotor unit 30 is made of, for example, a magnesium alloy on the surface of which has an anodic oxide film formed thereon, and includes a cylindrical body portion 32 and first and second rotor arms 33 and 34 spaced from the body portion 32 and extending forward from respective opposing locations on the outer peripheral surfaces of the rear end of body portion 32.

The body portion 32 is a substantially cylindrical member that is tapered so that its diameter decreases from the rear end toward the front and is then formed into a cylindrical shape. A front wall 32a is formed on the front portion of the body portion 32, and a boss portion 32b through which the front of the pinion gear 9 passes is formed in the central portion of the front wall 32a. The boss portion 32b is non-rotatably mounted to the front of the pinion gear 9. The nut 17 is screwed onto the front of the pinion gear 9 at the front of the front wall 32a, and the rotor 3 is fastened to the pinion gear 9 by the nut 17. A tubular-shaped line-entanglement prevention member 35 that prevents entanglement of fishing line with the spool shaft 16 is mounted at the front of the body portion 32.

The fishing line guide portion 31 is mounted on the tip of the first rotor arm 33 so as to be pivotable between a line-winding posture and a line-releasing posture. An interlocking mechanism 40 that interlocks with the pivoting of the fishing line guide portion 31 is mounted in the first rotor arm 33. The radially outward periphery of the first rotor arm 33 is covered by a first cover member 36.

Like the first rotor arm 33, the second rotor arm 34 extends forward and its radially outward periphery is covered by a second cover member 37. The second rotor arm 34 is provided for the purpose of maintaining the rotational balance of the rotor 3. For this reason, the second rotor arm 34 is configured such that its center of gravity C2 is shifted forward in order to bring it close to the center of gravity C1 of the first rotor arm 33, on which the fishing line guide portion 31 is mounted. In order to shift the center of gravity C2 forward, the second rotor arm 34 is provided with an opening 34a formed on the rear end side, and a weight-accommodating portion 34b for mounting a weight member 38 on the tip side. The weight member 38 is made of, for example, a tungsten alloy. Further, in order to shift the center of gravity C2 forward, the second rotor arm 34 extends forward (upward in FIGS. 7 and 8, leftward in FIG. 10) at a length that is longer than that of the first rotor arm 33, as clearly seen from FIGS. 7 and 8.

Here, as shown in FIG. 6, the two rotor arms 33 and 34 are formed such that a first line L1 drawn along a pivot center axis Y of the fishing line guide portion 31 of the first rotor arm 33 and a second line L2 drawn through a widthwise center Z of the second rotor arm 34 and substantially parallel to the first line L1 are arranged so that they are spaced at the same distance from the rotational axis X of the rotor unit 30 on opposite sides thereof. When the rotor arms 33 and 34 are arranged in this manner, the rotational balance can be most favorably maintained even if the fishing line guide portion 31 tilts severely away from the rotational axis X (outward with respect to the first line L1 in FIG. 6).

The line-entanglement prevention member 35 includes a cylindrical entanglement-preventing portion 35a so formed as to be flush with the cylindrical portion of the body portion 32, and a pair of tongue-shaped attachment portions 35b provided on the rear end of the entanglement-preventing portion 35a opposite each other with the rotational axis X therebetween. The tip of the entanglement-preventing portion 35a has a larger diameter than the rest of the entanglement preventing portion 35a, thereby preventing the fishing line from entering the inside of the spool 4. In addition, a weight-accommodating portion 35c for accommodating a weight member 39 for correcting rotational balance is formed on the inner peripheral surface of the tip of the entanglement-preventing portion 35a. The weight member 39 is also made of, for example, a tungsten alloy. Although the weight accommodating portion 35c is depicted in FIG. 3 as if it is formed at a location near the second rotor arm 34 for the sake of clarity in illustration, the weight accommodating portion 35c is actually disposed, as shown in FIG. 6, at the mid position between the two rotor arms 33 and 34 in the direction in which the fishing line guide portion 31 pivots. By disposing the weight accommodating portion 35c in this way, the rotational balance can be corrected by the weight member 39 that is disposed on the opposite side of the fishing line guide portion 31 with respect to the rotational axis X, even though the fishing line guide portion 31 tilts in a direction further away from the rotational axis X than the first line L1.

As shown in FIGS. 3 and 6, the line-entanglement prevention member 35 is fastened to the front wall 32a by two screw members 29, which are screwed from the front of the attachment portions 35b. The front face of the front wall 32a and the attachment portions 35b are designed to form a ring-like flat surface when the line-entanglement prevention member 35 is fitted. In order to form such a flat surface with the attachment portions 35b on the front face of the front wall 32a, recessed portions 32c in which the tongue-like-shaped attachment portions 35b are fitted are formed in the front wall 32a. Accordingly, even when foreign matter enters from the spool 4 side and attaches to the spool, the foreign matter can be easily removed by detaching the spool 4 and, for example, wiping it off.

The fishing line guide portion 31 is arranged so that fishing line is smoothly guided from the fishing rod to the spool 4 and wound around the spool 4. Thus, as shown in FIG. 6, the fishing line guide portion 31 tilts severely outward (left to right in FIG. 6) from the rotational axis X of the rotor such that fishing line will be easily guided onto the outer peripheral surface of a bobbin 4a (described below) of the spool 4. The fishing line guide portion 31 includes, as shown in FIGS. 6 to 9, a support member 41 fitted to the tip of the first rotor arm 33, a stationary shaft 42 whose base end is fixedly coupled to the tip of the support member 41, a line roller 43 that is rotatably mounted to the stationary shaft 42 and is capable of guiding fishing line, a stationary shaft cover 44 provided on the tip of the stationary shaft 42, and a fishing line-catching portion 45 that is provided on the tip of the stationary shaft cover 44 and which catches the fishing line.

The support member 41 is fitted on the tip of the fishing line guide portion 31 so as to be pivotable between a line-winding posture and a line-releasing posture. The stationary shaft 42 is so configured that its base end is locked non-rotatably to the tip of the support member 41, and is fixedly coupled to the support member 41 with a mounting bolt 42a. As shown in FIG. 6, the tip of the stationary shaft 42 is slightly inclined toward the spool 4 with respect to the pivoting surface (FIG. 1) of the support member 41. The line roller 43 is rotatably mounted onto the outer periphery of the stationary shaft 42 via a pair of bearings 46. A ring-shaped guide groove 47 for guiding fishing line is formed on the outer peripheral surface of the line roller 43, so that line kinks do not occur easily. Both ends of the outer periphery of the line roller 43 are covered by the support member 41 and the stationary shaft cover 44.

Figure 7:
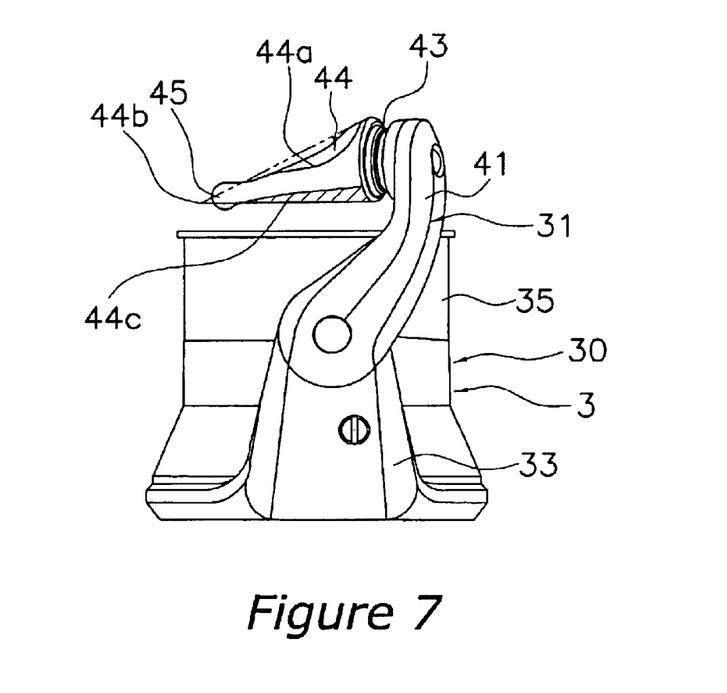
FIG. 7 is a right side view of the rotor in accordance with the embodiment of the present invention.
Figure 8:
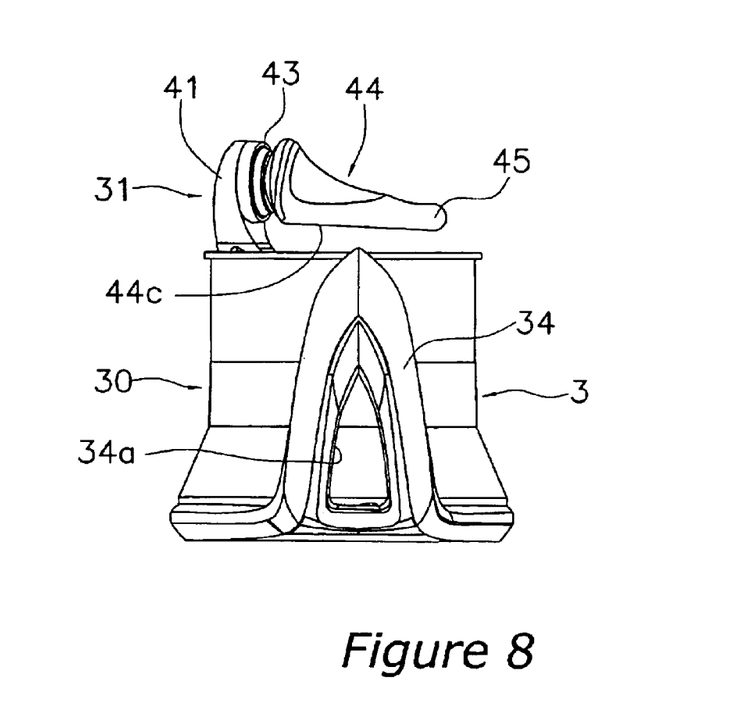
FIG. 8 is a left side view of the rotor in accordance with the embodiment of the present invention.

The stationary shaft cover 44 is made of, for example, a stainless steel alloy, and is formed integrally with the stationary shaft 42 as a one-piece unitary member. The stationary shaft cover 44 is arranged on the tip side of the stationary shaft 42, the vertex 44b of the stationary shaft cover 44 is tilted rearward (downward in FIG. 9) further from the tip 42a of the stationary shaft 42. The stationary shaft cover 44 is an approximately cone-shaped member that has a fishing line guide surface 44c provided on the reel unit 2 side thereof (lower side of FIG. 9). The region on the rear surface of the stationary shaft cover 44 indicated by hatching in FIG. 7 is the fishing line guide surface 44c that guides fishing line to the line roller 43. As shown in FIG. 6, the tip of the stationary shaft cover 44 is concentric with the stationary shaft 42, and is inclined toward the spool 4. When the fishing line guide portion 31 is in the line-winding posture, the fishing line guide surface 46c is arranged such that the distance between the fishing line guide surface 44c and the reel unit 2 gradually decreases from the tip side toward the fishing line-catching portion 45 side of the stationary shaft 42. A grasping portion 44a that is recessed from the rest of the stationary shaft cover 44 is formed on the front face of the stationary shaft cover 44. This type of grasping portion 44a is useful in returning the fishing line guide portion 31 from the line-winding posture to the line-releasing posture. The fishing line-catching portion 45 is formed so that it bulges below the vertex 44b to smoothly continue with its ridge line and protrude outwardly from the vertex 44b, and so that the tip of the fishing line-catching portion 45 is thicker than the rest of the fishing line-catching portion 45. The tip of the fishing line-catching portion 45 is rounded into a spherical shape.

Figure 9:
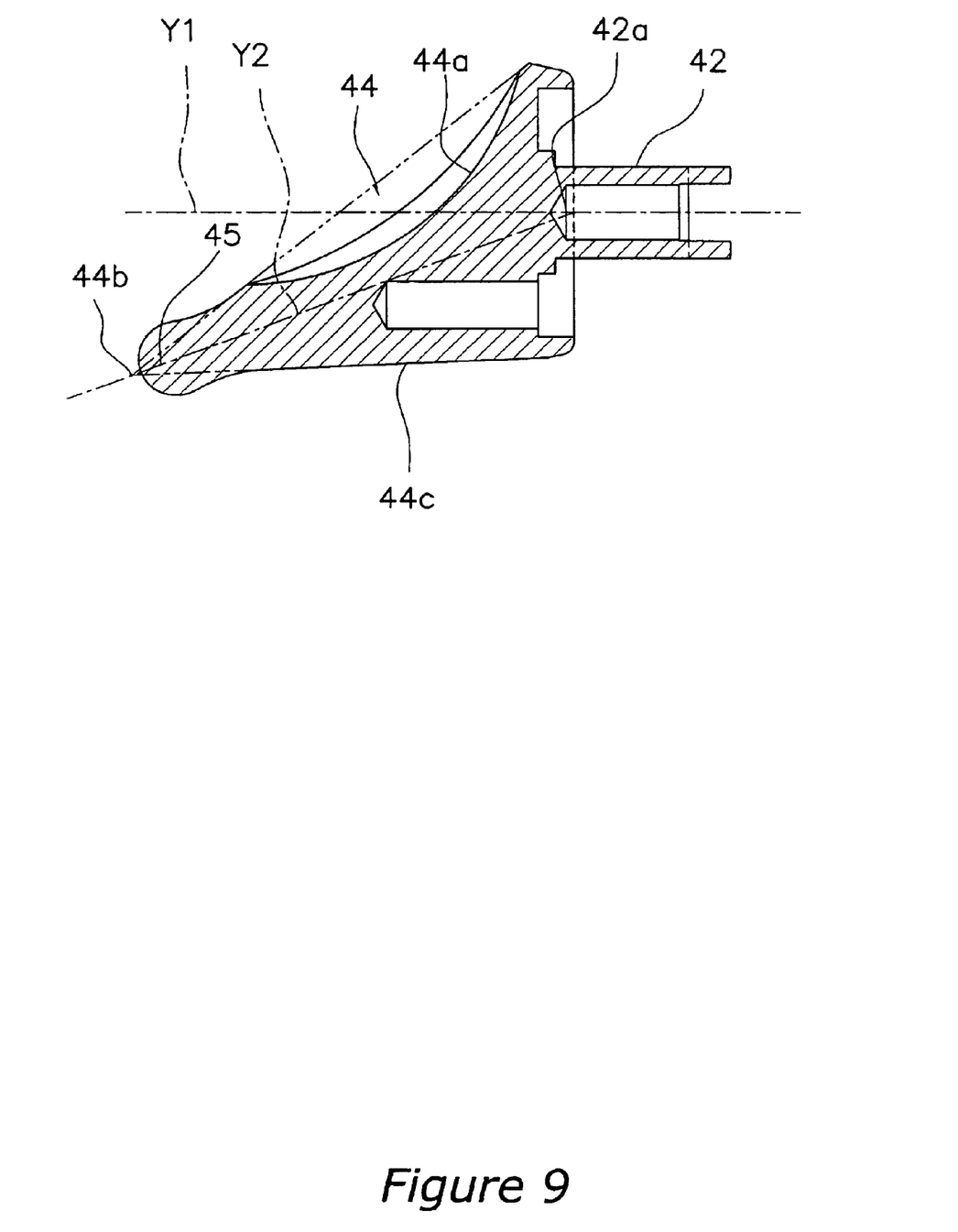
FIG. 9 is a cross-sectional view of the stationary shaft cover in accordance with the embodiment of the present invention.

With the fishing line guide portion 31 thus configured, the fishing line does not easily come off once it is caught by the fishing line-catching portion 45 because the tip of the fishing line-catching portion 45 is thicker than the rest of the fishing line-catching portion 45. In addition, because the fishing line-catching portion 45 and the vertex 44b of the stationary shaft cover 44 are tilted rearward, the fishing line caught by the fishing line-catching portion 45 can be reliably guided to the guide groove 47 of the line roller 43 by the line-guiding surface 44c.

Figure 10:
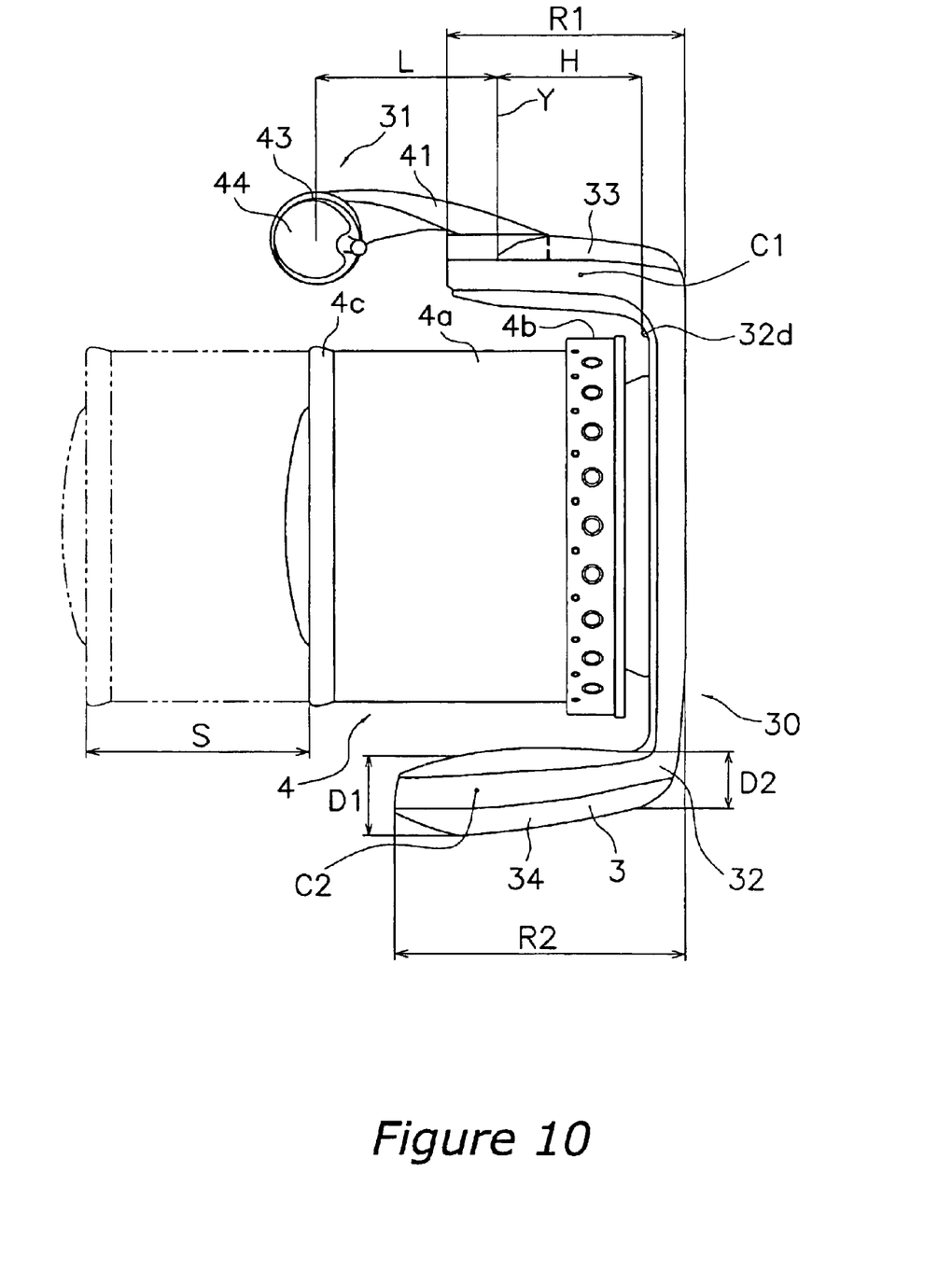
FIG. 10 is a view showing the dimensional relationships of the rotor in accordance with the embodiment of the present invention.

The dimensional relationships of the rotor 3 are shown in detail in FIG. 10.

A distance (H) in the axial direction of the spool 4 between a surface of the body portion 32 that is nearest to the spool 4 (the front surface of a boss portion 32d on the front surface of the rear end portion of the body portion 32 in this embodiment) and the pivot center axis Y of the fishing line guide portion 31 is in a range of 50% or greater and 80% or less of a distance (S) that the spool 4 moves forward and backward. More specifically, where the distance (H) is 26 mm and the distance (S) is 40 mm, the distance (H) is 65% of the distance (S).

A distance (L) in the axial direction of the spool 4 between the rotational center of the line roller 43 and the pivot center axis Y of the support member 41 is in a range between 50% or greater and 85% or lower of the distance (S) that the spool 4 moves forward and backward. More specifically, when the distance (L) is 32.7 mm and the distance (S) that is 40 mm, the distance (L) is 81.75% of the distance (S).

A distance (R1) in the axial direction of the spool 4 between the rear surface of the rear end portion of the tubular portion 32 and a front end (left hand side end in FIG. 10) of the first rotor arm 33 is shorter than a distance (R2) in the axial direction of the spool 4 between the rear surface of the rear end portion of the tubular portion 32 and the front end of the second rotor arm 34. In addition, a thickness (D1) in the radial direction of the spool 4 at the front end side of the second rotor arm 34 is thicker than a thickness (D2) in the radial direction of the spool 4 at the rear end side of the second rotor arm 34. such that a center of gravity C2 of the second rotor arm 34 is shifted frontward.

Anti-Reverse Mechanism 50

As shown in FIG. 3, an anti-reverse mechanism 50 can prohibit/permit the rotation of the rotor 3 in the line reel-out direction. The anti-reverse mechanism 50 includes a roller-type one-way clutch 51 fitted to the mechanism support portion 10b of the housing unit 10. The one-way clutch 51 can be switched between a reverse-rotation prohibited state and a reverse-rotation permitted state. The anti-reverse mechanism 50 further includes a switching operation unit 52 for switching the one-way clutch 51 between the reverse-rotation prohibited state and the reverse-rotation permitted state. The switching operation unit 52 is supported pivotably by the operation support portion 10c and the intermediate support portion 10d of the housing unit 10. Anti-reverse mechanisms are a component well known in the art. Therefore, the structure and functions of the anti-reverse mechanism 50 will not be explained in further detail herein.

Spool 4

Figure 11:
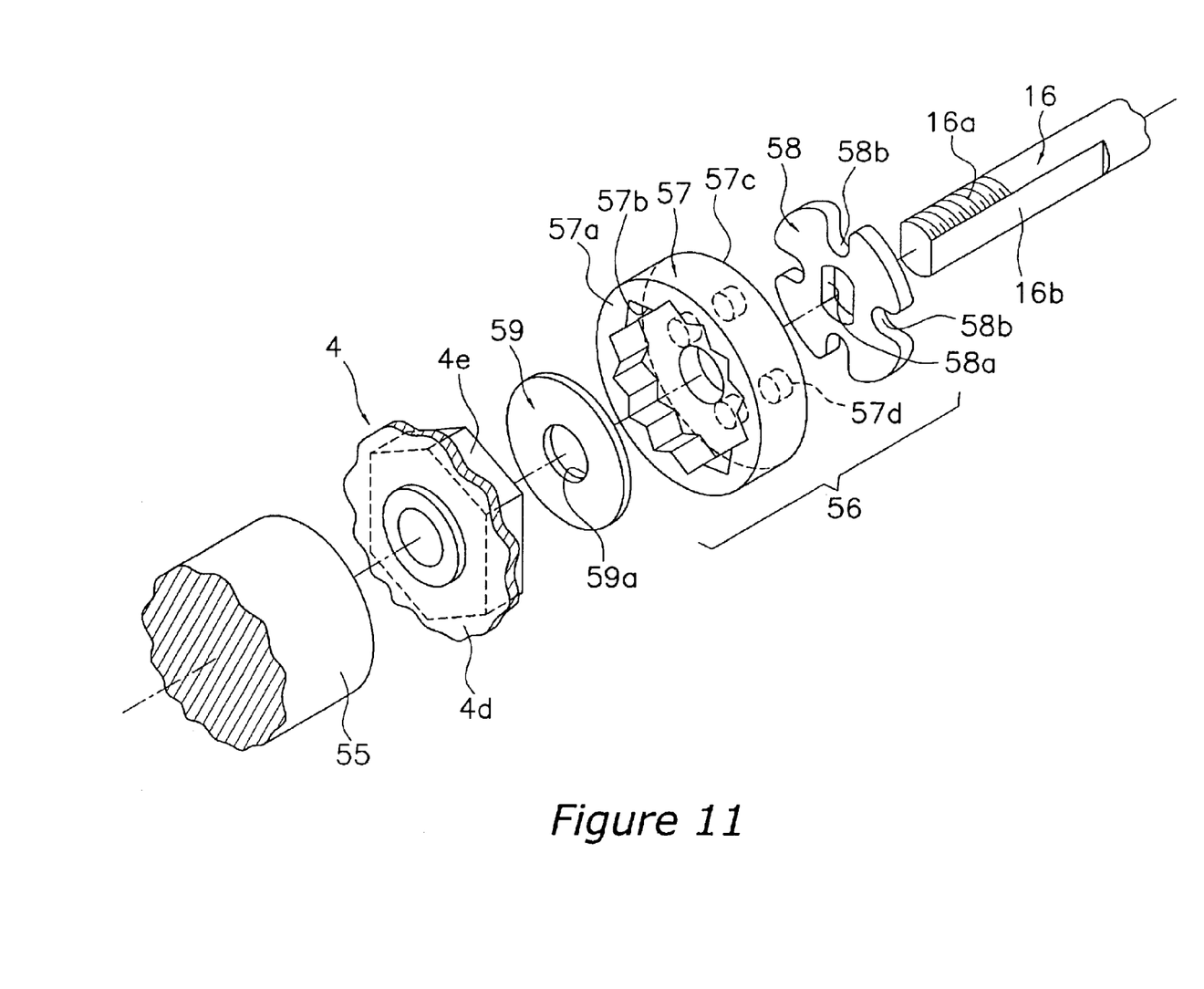
FIG. 11 is an exploded oblique view showing a mounting structure of a spool in accordance with the embodiment of the present invention.

As shown in FIG. 11, a male screw portion 16a and chamfered portions 16b that are cut out parallel to each other are formed on the fore-end of the spool shaft 16, and the spool 4 is fitted non-rotatably and detachably to the spool shaft 16 by a removable nut 55 that is screwed on the male screw portion 16a.

The spool 4 can be mounted in a plurality of rotational phases with respect to the spool shaft 16, and the length at which the tackle hangs can be changed. The spool 4 has, as shown in FIG. 3, a shallow-channel contour, and includes the bobbin 4a around the outer periphery of which fishing line is wound, a cylindrical skirt portion 4b formed on the rear end of the bobbin 4a so as to have a larger diameter than the bobbin 4a, and a front flange portion 4c formed on the front end of the bobbin 4a so as to have a slightly larger diameter than the bobbin 4a.

The bobbin 4a is non-rotatable relative to the spool shaft 16, and is arranged on the outer peripheral side of the body portion 32 and the line-entanglement prevention member 35 of the rotor 3. The bobbin 4a includes a front wall portion 4d formed integrally with the tip side of the inner periphery of the bobbin 4a, and a boss portion 4e formed integrally with the inner peripheral side of the front wall portion 4d so as to protrude rearward. The front wall portion 4d has a number of perforations 4g formed therein that serve to reduce weight.

The boss portion 4e has, as shown in FIG. 11, a regular hexagonal outer shape. The boss portion 4e is fitted rotatably to the spool shaft 16, but is made non-rotatable relative to the spool shaft 16 with a mounting member 56. The mounting member 56 includes a boss-engagement portion 57 for engaging non-rotatably with the boss portion 4e, and an engagement member 58 for making the boss-engaging portion 57 non-rotatable relative to the spool shaft 16. The boss-engagement portion 57 includes an interlock recess 57b that has a twelve-point star-like cross section and is formed on its front face 57a opposing the boss portion 4e, and four circular interlock projections 57d for engaging with the engagement member 58 provided on its rear face 57c. The engagement member 58 is a disk-like member having at its center a slit 58a for engaging with the chamfered portions 16b of the spool shaft 16. Also provided on its outer peripheral surface are four interlock grooves 58b for interlocking with the interlock projections 57d. By fitting the slit 58a with the chamfered portions 16b, the engagement member 58 is fitted non-rotatably to the spool shaft 16. By interlocking the interlock projections 57d with the interlock grooves 58b, the boss-engagement portion 57 is made non-rotatable relative to the spool shaft 16. It should be noted that a washer member 59 made of an elastic material is fitted in the interlock recess 57b of the boss-engagement portion 57. The washer member 59 has a hole 59a having an inner diameter slightly smaller than the outer diameter of the spool shaft 16. By fitting the hole 59a onto the spool shaft 16, back-and-forth movement of the boss-engagement portion 57 and the engagement member 58 is restricted relative to the spool shaft 16.

By engaging the interlock recess 57b having a star-like cross section with the boss portion 4e having a hexagonal cross section, the spool 4 can be fitted onto the spool shaft 16 non-rotatably with a 30-degree rotational phase. Consequently, the spool 4 can be rotated by merely loosening the removable nut 55, and the hanging length of the tackle can be adjusted without rotating the rotor 3.

As shown in FIG. 1, the skirt portion 4b has a number of perforations 4f having varied inner diameters formed therein that serve to reduce weight. The front flange portion 4c has a tapered outer peripheral surface that slightly increases in diameter from the outer peripheral surface of the bobbin 4a toward the front. This greatly reduces the release resistance that acts on fishing line when casting.

Operation of the Spinning Reel

Next, handling and operation of the spinning reel will be described.

It should be noted that the description of the handling describes a situation in which casting is performed with the right hand. When casting, the fishing line guide portion 31 is put in the line-winding posture to hook the fishing line on the fishing line guide portion 31, and the hanging length of the tackle is then adjusted.

First, the handle assembly 1 is rotated in the line reel-in direction so that the fishing line guide portion 31 is in a predetermined rotational phase in which the spool 4 is disposed near the tip of its stroke. Specifically, when casting with the right hand, for example, the fishing line guide portion 31 is easily operated with the left hand when the fishing line guide portion 31 is on the left of the spool 4, viewed from the rod side, taking into consideration the operability of the fishing line guide portion 31 and the ease of picking up the fishing line.

To change the hanging length of the tackle, the removable nut 55 is loosened and the spool 4 is moved forward to release the engagement between the boss portion 4e and the boss-engagement portion 57. The spool 4 is rotated in this state so that the hanging length of the tackle is adjusted to be at an appropriate position. After adjusting the hanging length of the tackle, the spool 4 is moved rearward to engage the boss portion 4e with the boss-engaging portion 57. At this time, the hanging length of the tackle can be finely adjusted since the boss portion 4e can engage with the boss-engagement portion 57 at every 30 degrees. Then, the removable nut 55 is tightened, and the adjustment of the hanging length is thus completed.

In this state, with the fingertip of the left hand (the hand not holding the fishing rod), the stationary shaft cover 44 of the fishing line guide portion 31 is grasped to pivot the fishing line guide portion 31 over to the line-releasing posture. When this is done, because the grasping portion 44a is formed on the stationary shaft cover 44, the stationary shaft cover 44 can be easily grasped and the fishing line guide portion 31 can be grasped and easily pivoted. Then, fishing line wound on the spool 4 is grasped with the left hand, and the fishing rod is cast with the index finger of the right hand hooking the line.

After casting, the fishing line guide portion 31 is pivoted back from the line-releasing posture to the line-winding posture with the left hand, and the fishing line is grasped with the left hand to place it in the fishing line-catching portion 45 of the fishing line guide portion 31. The fishing line caught with the fishing line-catching portion 45 is guided through the fishing line guide surface 44c of the stationary shaft cover 44 to the guide groove 47 of the line roller 43. The handle assembly 1 is slightly rotated in the line reel-in direction in this state to apply slight tension to the fishing line, and the fishing rod is set aside.

When the fishing line is caught, because the tip of the fishing line-catch portion 45 is thicker than the other portions thereof, it will be difficult for the fishing line caught by the fishing line-catch portion 45 to slip off from the thick tip. Thus, there will no longer be a need to install a separate member to prevent the fishing line from slipping off. Because of this, it will be easy for the fishing line to be caught on the fishing line-catch portion 45, and the fishing line can be prevented from falling off with a simple structure.

In addition, because the stationary shaft cover 44 is formed into an approximate cone-shape in which the vertex 44b thereof is tilted rearward, the tip side of the fishing line guide surface 44c will easily draw near the reel unit 2 side from the base end side that continues to the ridge line, and the fishing line guided by the fishing line guide surface 44c will be guided by the line roller 43. Because of this, by simply catching the fishing line on the fishing line-catching portion 45, the fishing line will be easily guided to the line roller 43 via the fishing line guide surface 44c and it will be difficult for the guided fishing line to fall off from the fishing line guide surface 44c. Thus, the fishing line can be easily caught, and the fishing line can be prevented from coming off from the line roller 43 with a simple structure.

When a fish is caught on the tackle and the handle assembly 1 is rotated, the rotor 3 rotates in the line reel-in direction and the spool 4 is moved back and forth. At the same time, the rotation of the handle assembly 1 is transmitted to the master gear 7 through the master gear shaft 8, rotating the rotor 3 through the pinion gear 9. In addition, the oscillating mechanism 6 is operated with the pinion gear 9 via the gear-down train 20, moving the spool 4 back and forth.

At this point, because the first and the second rotor arms 33, 34 are disposed opposite to each other on either side of the rotational axis X, rotational balance can be more favorably maintained even though the fishing line guide portion 31 is disposed in a position that is tilted outward with respect to the rotational axis X. Moreover, the rotational balance is more accurately corrected because the balance correcting weight members 38, 39 are mounted in the second rotor arm 34 and the line-entanglement prevention member 35.

This spinning reel is a bail-less type reel in which the fishing line guide portion 31 is arranged only on the first rotor arm 33. Here, because the distance (R1) between the rear surface of the rear end portion of the tubular portion 32 and the front surface of the tip portion of the first rotor arm 33 is shorter than the distance (R2) between the rear surface of the rear end of the tubular portion 32 and the front surface of the tip portion of the second rotor arm 34, the center of gravity C2 of the second rotor arm 34 can be disposed forward relative to the center of gravity C1 of the first rotor arm 33. Thus, the rotational balance of the rotor 3 can be improved because the center of gravity C1 of the first rotor arm 33 on which the fishing line guide portion 31 is mounted can be brought to the same position as the center of gravity C2 of the second rotor arm 34.

Other Embodiments (a) In the aforementioned embodiment, the first rotor arm and the second rotor arm are disposed substantially the same distance away from the rotational axis. However, the distance from the rotational axis can be changed in accordance with the center of gravity or the mass of each rotor arm.

(b) In the aforementioned embodiment, the stationary shaft of the fishing line guide portion and the stationary shaft cover are integrally formed with each other as a one-piece unitary member. However, these parts may be formed separately.

(c) In the aforementioned embodiment, the fishing line-catching portion is unitarily formed with the stationary shaft cover a one-piece unitary member. However, these parts may be formed separately.

According to the present invention, because the pivot center of the fishing line guide portion mounted on the first rotor arm is disposed such that it is tilted with respect to the rotational axis of the rotor, the fishing line guide portion can be disposed such that it is tilted with respect to the rotational axis, and the fishing line guide portion can be disposed in a position in which it is easy to guide the fishing line to the line winding portion of the spool that is disposed concentric with the rotational axis. In addition, because the second rotor arm is disposed such that it is tilted away from the first rotor arm, rotational balance will be easy to obtain even if the fishing line guide portion or the first rotor arm is disposed in a tilted position.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-028465 and 2003-028472. The entire disclosure of Japanese Patent Application Nos. 2003-028465 and 2003-028472 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A rotor for a spinning reel that winds fishing line around a spool that is mounted to be movable back and forth on a reel unit that is adapted to be mounted to a fishing rod, the rotor comprising:
   a rotor unit having
     a body portion that is mounted to the reel unit so as to be rotatable about a rotational axis, and
     first and second rotor arms that each extend forward from opposing positions on an outer peripheral surface of the body portion; and
   a fishing line guide portion that guides the fishing line to the spool, and is mounted only on the first rotor arm so as to be pivotable between a line-winding posture and a line-releasing posture about a pivot center;
   wherein the first and second rotor arms are formed such that a first line that is drawn along a pivot center axis of the fishing line guide portion and a second line that is drawn through a width-wise center of the second rotor arm and is substantially parallel to the first line are positioned on opposite sides of the rotational axis of the body portion.

2. The rotor for a spinning reel as set forth in claim 1, wherein
   the first and second lines are disposed at a substantially equal distance from the rotational axis.

3. The rotor for a spinning reel as set forth in claim 1, wherein
   the second rotor arm extends forward further than the first rotor arm.

4. The rotor for a spinning reel as set forth in claim 1, further comprising
   a first weight member that is accommodated within the second rotor arm.

5. The rotor for a spinning reel as set forth in claim 4, wherein
   the first weight member is accommodated in a front portion of the second rotor arm.

6. The rotor for a spinning reel as set forth in claim 1, further comprising:
   a tubular-shaped line-entanglement prevention member that is mounted to the body portion; and;
   a second weight member that is disposed on an inner peripheral surface of the line-entanglement prevention member such that the rotational axis of the body portion is interposed between the second weight member and the fishing line guide portion.

7. The rotor for a spinning reel as set forth in claim 1, wherein
   the fishing line guide portion includes:
     a support member that is pivotably mounted on a tip of the first rotor arm;

a stationary shaft whose base end is mounted to a tip of the support member, a line roller that is rotatably mounted to the stationary shaft and capable of guiding the fishing line, a stationary shaft cover that is provided on a tip of the stationary shaft and includes a fishing line guide surface that guides the fishing line to the line roller, and a fishing line-catching portion provided on a tip of the stationary shaft cover.

8. The rotor for a spinning reel as set forth in claim 7, wherein the stationary shaft cover is an approximately cone shaped member whose vertex tilts rearward further from the tip of the stationary shaft.

9. The rotor for a spinning reel as set forth in claim 1, wherein a thickness of a front end side of the second rotor arm is thicker than a thickness of a rear end side of the second rotor arm.

10. The rotor for a spinning reel as set forth in claim 1, wherein the second rotor arm includes a cut-out portion formed on its rear end side.

11. The rotor for a spinning reel as set forth in claim 1, wherein a tip portion of the second rotor arm is formed into a shape that projects forward.

12. A spinning reel adapted to be mounted to a fishing rod, comprising:

a handle assembly;

a reel unit adapted to be mounted to the fishing rod and rotatably supporting the handle assembly;

a rotor rotatably mounted on the front of the reel unit, the rotor including a rotor unit having a body portion that is mounted to the reel unit so as to be rotatable about a rotational axis, and first and second rotor arms that each extend forward from opposing positions on an outer peripheral surface of the body portion; and a fishing line guide portion that guides the fishing line to the spool, and is mounted only on the first rotor arm so as to be pivotable between a line-winding posture and a line-releasing posture about a pivot center;

wherein the first and second rotor arms are formed such that a first line that is drawn along a pivot center axis of the fishing line guide portion and a second line that is drawn through a width-wise center of the second rotor arm and is substantially parallel to the first line are positioned on opposite sides of the rotational axis of the rotor; and a spool that is disposed on the front of the rotor and which moves back and forth.

13. The spinning reel as set forth in claim 12, wherein the first and second lines are disposed at a substantially equal distance from the rotational axis.

14. The spinning reel as set forth in claim 12, wherein the second rotor arm extends forward further than the first rotor arm.

15. The spinning reel as set forth in claim 12, further comprising a first weight member that is accommodated within the second rotor arm.

16. The spinning reel as set forth in claim 15, wherein the first weight member is accommodated in a front portion of the second rotor arm.

17. The spinning reel as set forth in claim 12, further comprising:

a tubular-shaped line-entanglement prevention member that is mounted to the body portion; and;

a second weight member that is disposed on an inner peripheral surface of the line-entanglement prevention member such that the rotational axis of the body portion is interposed between the second weight member and the fishing line guide portion.

18. The spinning reel as set forth in claim 12, wherein the fishing line guide portion includes:

a support member that is pivotably mounted on a tip of the first rotor arm;

a stationary shaft whose base end is mounted to a tip of the support member, a line roller that is rotatably mounted to the stationary shaft and capable of guiding the fishing line, a stationary shaft cover that is provided on a tip of the stationary shaft and includes a fishing line guide surface that guides the fishing line to the line roller, and a fishing line-catching portion provided on a tip of the stationary shaft cover.

19. The spinning reel as set forth in claim 18, wherein the stationary shaft cover is an approximately cone shaped member whose vertex tilts rearward further from the tip of the stationary shaft.

20. The spinning reel as set forth in claim 12, wherein a thickness of a front end side of the second rotor arm is thicker than a thickness of a rear end side of the second rotor arm.

21. The a spinning reel as set forth in claim 12, wherein the second rotor arm includes a cut-out portion formed on its rear end side.

22. The spinning reel as set forth in claim 12, wherein a front portion of the second rotor arm is formed into a shape that projects forward.

* * * * *